US006366220B1

(12) United States Patent
Elliott

(10) Patent No.: US 6,366,220 B1
(45) Date of Patent: Apr. 2, 2002

(54) RF TAG BASED SYSTEM AND METHOD FOR DRIVE-THROUGH APPLICATIONS

(75) Inventor: Brig Barnum Elliott, Arlington, MA (US)

(73) Assignee: BBNT Solutions LLC, Cambridge, MA (US)

(*) Notice: Subject to any disclaimer, the term of this patent is extended or adjusted under 35 U.S.C. 154(b) by 0 days.

(21) Appl. No.: 09/708,864

(22) Filed: Nov. 8, 2000

(51) Int. Cl.[7] .............................................. G08G 1/065
(52) U.S. Cl. ..................... 340/928; 340/572; 340/825.3; 340/825.35; 340/825.69; 340/994; 705/22; 705/26; 705/28; 705/44
(58) Field of Search ................................. 340/928, 572, 340/572.1, 825.35, 825.69, 539, 531, 825.3, 994; 705/22, 23, 26, 28, 44

(56) References Cited

U.S. PATENT DOCUMENTS

| | | | | |
|---|---|---|---|---|
| 5,805,082 A | * | 9/1998 | Hassett | 340/928 |
| 5,806,018 A | * | 9/1998 | Smith et al. | 701/211 |
| 5,819,234 A | * | 10/1998 | Slavin et al. | 705/13 |
| 5,892,441 A | | 4/1999 | Woolley et al. | 340/539 |
| 5,899,980 A | * | 5/1999 | Wilf et al. | 705/26 |
| 5,991,739 A | * | 11/1999 | Cupps et al. | 340/994 |
| 5,991,749 A | * | 11/1999 | Morrill, Jr. | 705/44 |
| 6,070,156 A | * | 5/2000 | Hartsell, Jr. | 705/413 |
| 6,116,505 A | * | 9/2000 | Withrow | 235/381 |

OTHER PUBLICATIONS

John Gregg, Fast Lane and Fast Food Make a High–Tech Hookup, The MetroWest Daily News, Apr. 25, 2001, pp. A1, A4.

* cited by examiner

Primary Examiner—Jeffery Hofsass
Assistant Examiner—Hung Nguyen
(74) Attorney, Agent, or Firm—Leonard Charles Suchyta; James K. Weixel

(57) ABSTRACT

A system and method are provided that allow a customer to order drive-through menu items using an RF tag (104). A customer vehicle (102) is equipped with a radio-frequency (RF) tag (104). Prior to placing an order, the customer opens an account and creates a default menu using a food vendor's web site. To order items from the default menu, the customer approaches a drive-through order station (312) at a fast food vendor location (318). As vehicle 102 passes order station (312) a first transponder (110A) queries RF tag (104) and processes a return signal (114). Identification information is extracted from return signal (114) such that the customer's order, consisting of the default menu items, is prepared. The customer's vehicle 102 then approaches pick-up station (316) and a second transponder (110B) queries RF tag (104) and subsequently bills the customer's account for the ordered items.

23 Claims, 7 Drawing Sheets

RF TAG BASED SYSTEM AND METHOD FOR DRIVE-THROUGH APPLICATIONS

FIELD OF THE INVENTION

The invention relates generally to the field of radio-frequency (RF) tags and more particularly to a system and method of using RF tags for the purchase of goods and services from a vendor employing RF tag reading equipment.

BACKGROUND OF THE INVENTION

RF tags are typically used transactions involving motor vehicles. These, vehicle related transactions often involve the payment of tolls for road, bridge, or tunnel usage. When an RF tag is employed for toll collection, the vehicle can pass through the toll lane with out coming to a stop when making payment.

An RF tag is a passive device that is preprogrammed with specific information. For vehicle applications, the RF tag is typically programmed with an account number for an authorized user (or customer). The account number in turn may be associated with the customer's address, phone number, vehicle model, license plate number, and credit card account. Associating the RF tag with the customer's name and address enables the party issuing the RF tag, hereinafter tag-vendor, to send the customer monthly statements detailing account activity. Affiliating the RF tag with a customer's credit card account provides the tag-vendor with a convenient and secure way of billing the customer for accrued charges. In addition, using the credit card account ensures that the tag-vendor is immediately paid every time the customer incurs a charge using the RF tag. And finally, associating the RF tag with a license plate number and a vehicle model helps the tag-vendor detect fraudulent transactions.

FIG. 1 illustrates a typical prior art embodiment employing RF tag technology to perform toll collection involving a vehicle. A moving vehicle 102, equipped with an RF tag 104, approaches a toll lane on a roadway 106. The toll lane is equipped with an automated electronic toll collection system. The electronic toll collection system is comprised of an RF transponder 110 and associated processing equipment. As vehicle 102 approaches a toll collection point 109, an RF transponder 110, mounted on a structure 108, sends out a radio signal in the direction of the oncoming vehicle 102. The outgoing signal from the transponder is referred to as a query signal 112. When query signal 112 contacts RF tag 104, a resonance is established inside RF tag 104. The resonance causes RF tag 104 to emit a radio signal, which is picked up by RF transponder 110. The radio signal emanating from the queried RF tag 104 is referred to as a return signal 114 which is shown as a group, or series, of wave-front phenomena containing unique identification information about RF tag 104. Typically, RF tag 104 is attached to the inside of the windshield, or on the front bumper of vehicle 102 to ensure that query signal 112 reaches RF tag 104 without interference.

Transponder 110 receives return signal 114 and communicates it to a processing system (not shown). The processing system is generally run on a computer comprising a database and specialized software instructions for processing transactions. The database contains customer information that can be uniquely associated with the identification information contained in return signal 114. In particular, the database contains the information necessary to bill a customer for a toll. After retrieving the customer information associated with a particular return signal 114, the database facilitates billing the customer's account for the cost of the toll. Additionally, the database may be configured in a manner to allow it to be used in issuing the customer a statement detailing one or more transactions over a given time period.

To protect against fraud, many toll plazas augment the RF toll collection system with a digital surveillance camera 116 oriented to photograph the vehicle and license plate when processing a transaction. If a surveillance camera is used, a digital image of the vehicle may be stored in the database used to facilitate processing transactions.

FIG. 2 illustrates a prior art method that may be used by a customer to open an RF tag account with a tag-vendor. First, a customer requests an RF tag 104 in-person, by mail, or over the Internet (step 202). Then, the customer provides billing information so a tag-vendor can collect fees that become due as an issued RF tag 104 is used to pay tolls, (step 204). Most often, the billing information comprises a credit card number. When a credit card number is used, any charges incurred using RF tag 104 are billed to the card and appear on the customer's monthly statement. Alternatively, billing information can comprise bank account information to facilitate debit card like transactions, or a pre-funded account can be established with either the tag-vendor or a trusted third party, such as a bank. If desired, step 204 can comprise the gathering of other information such as the customer's home address, occupation, license plate number, vehicle type, and the like.

An RF tag account is opened by the tag-vendor after the customer's billing information is verified, (step 206). Upon opening the account, a customer receives an RF tag from the tag-vendor (step 208). RF tag 104 is then placed in, or on, the vehicle according to the tag-vendor's instructions (step 210). After RF tag 104 is placed in the vehicle, the customer can begin using it for allowed transactions.

While RF tag technology is primarily used for toll collection, there are other areas of human activity, involving motor vehicles, for which RF tag technology may offer solutions. One such problem is the delays that may be experienced at fast food restuaurants.

Today, many people believe that they are pressed for time. For these people, time pressure may be experienced both at the office and at home. Affected people may feel like they are always behind schedule and that they never have enough time to complete the professional and personal tasks at hand. To fit more into a given day, many harried people often resort to fast foods for some, or all, of their daily meals. The large numbers of people using fast food restaurants has resulted in delays at many establishments especially during peak meal times, namely lunch and dinner. Often the congestion occurs at both the walk-up counters and drive-through lanes simultaneously. These delays may tend to anger the already harried customers and may cause some of them to forego visiting fast food establishments.

When customers who would normally have eaten at fast food restaurants opt for another solution, the establishments lose revenue. Additionally, the customers must find an alternative place to eat. The inconveniences associated with finding alternate dining locations may cause additional anxiety for these patrons. However, if fast food establishments can find ways to process more customer orders in a given time span, then more people are likely avail themselves to fast food.

Therefore, a system is needed that enables fast food establishments to process more customer orders in a given time period. The system should allow fast food vendors to increase the number of customers serviced without decreasing order accuracy or the quality of the food. Also, the system should allow the fast food vendors to utilize as much of their existing infrastructure as possible. Additionally, the system should provide customers with added convenience to give them incentive to use the system. Finally, the system should take advantage of existing technologies, to the extent possible, so that the cost of implementing the system is minimized.

SUMMARY OF THE INVENTION

Embodiments of the present invention include methods, systems, and computer program products for making transactions between parties one of whom has an RF tag associated with a desired product. One such embodiment comprises a method of making a transaction between a first party and a second party wherein the first party has an RF tag associated with a desired product. The second party queries the RF tag and received a return signal. Using the return signal, a desired product is identified and then made available. Then a monetary transaction is completed for the desired product.

In another embodiment, a system makes a desired item available to a receiving party. The system accomplishes this by using a transponder to identify a customer party based upon identification information associated with a return signal from an RF tag. The system uses a memory for storing information about a plurality of customer parties and a plurality of desired items wherein the desired items are associated with the customer parties. The customer parties are identified using the identification information associated with the return signal from the RF tag, and a processor coupled to the transponder and memory is used for processing the identification information.

In another embodiment, a computer program product comprising a computer useable medium having computer readable code is used to practice the invention. The computer readable code executes the steps necessary for making a monetary transaction with a receiving party by (1) processing a return signal from an RF tag wherein the return signal contains identification information, (2) identifying a customer party using the identification information, (3) associating a desired product with the customer party, and (4) charging the customer party for the desired product.

Yet another embodiment comprises, a method for making a monetary transaction in which a desired product is made available to a customer party having an RF tag and a customer party account. A transponder sends a query signal to an RF tag. A return signal is received from the RF tag wherein the return signal contains identification information about the customer party. The return signal is processed and the identification information is associated with the customer party and a customer party account that was established prior to the monetary transaction. The customer party account also contains information about a desired product and a payment method. The customer party is charged for the desired product using the payment method and then the desired product is made available to the customer party.

An object of the present invention is to facilitate rapid order processing in drive-through applications while, at the same time, increasing order accuracy by reducing the chance for human error.

It is another object of the invention to increase customer convenience by enabling them to place drive through orders when they do not have adequate cash on hand.

Yet another object of the invention is to leverage existing technologies thus allowing vendors to quickly implement the invention while requiring minimal modifications to any existing infrastructure.

These and other objects of the present invention are addressed in the following detailed description of preferred embodiments, the drawings, and the appended claims. The detailed description and drawings are not intended to limit or define the scope of coverage sought. Rather, the scope of patent protection sought is defined by the appended claims.

DETAILED DESCRIPTION OF PREFERRED EMBODIMENTS

The disclosed invention allows a customer, possessing an RF tag 104, to order a set of predetermined items from a vendor. The fast food business is well suited to benefit from the invention because using it enhances order accuracy, shortens order-processing time, and allows businesses to service customers that do not have cash on hand.

Employing RF Tags in a Preferred Embodiment of the Invention

Figure 1:
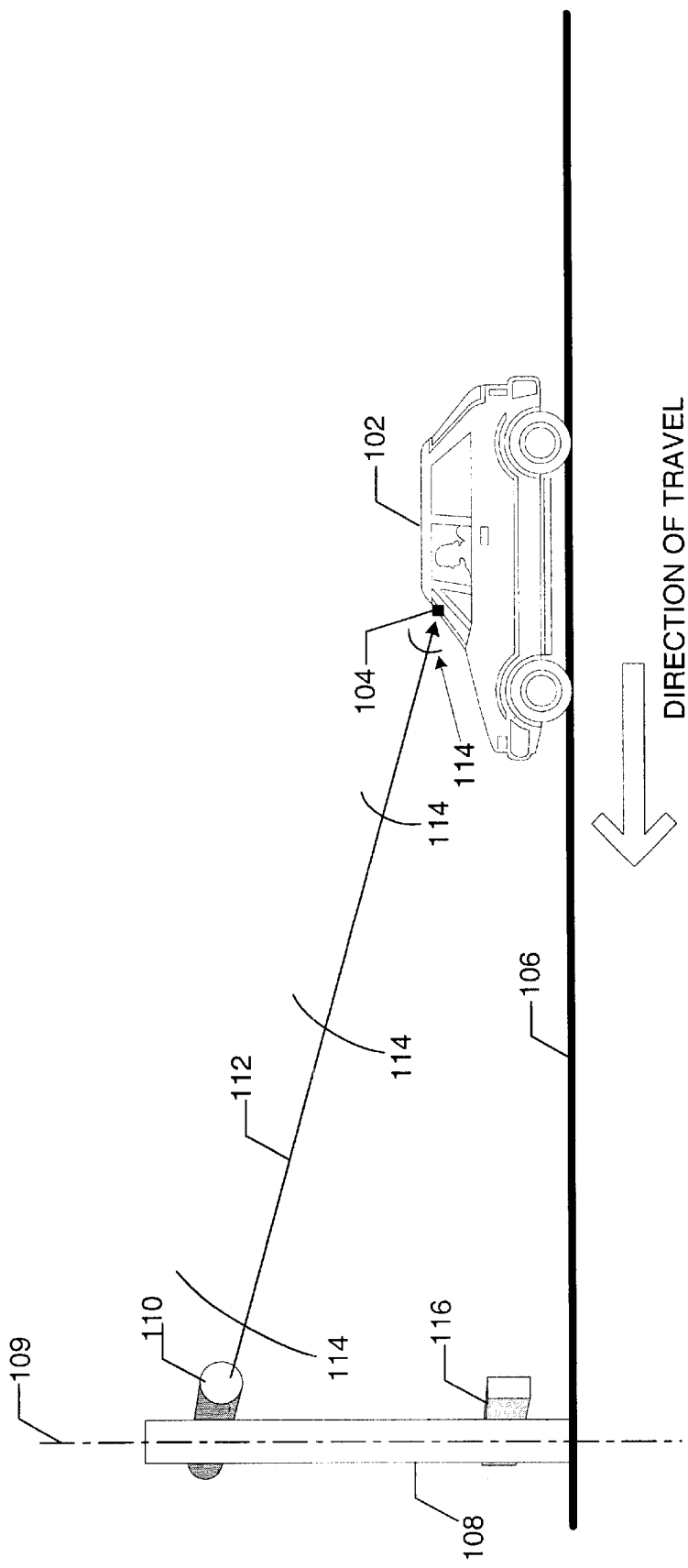
FIG. 1—illustrates the use of an RF tag for collection of tolls using a prior art technique.
Figure 2:
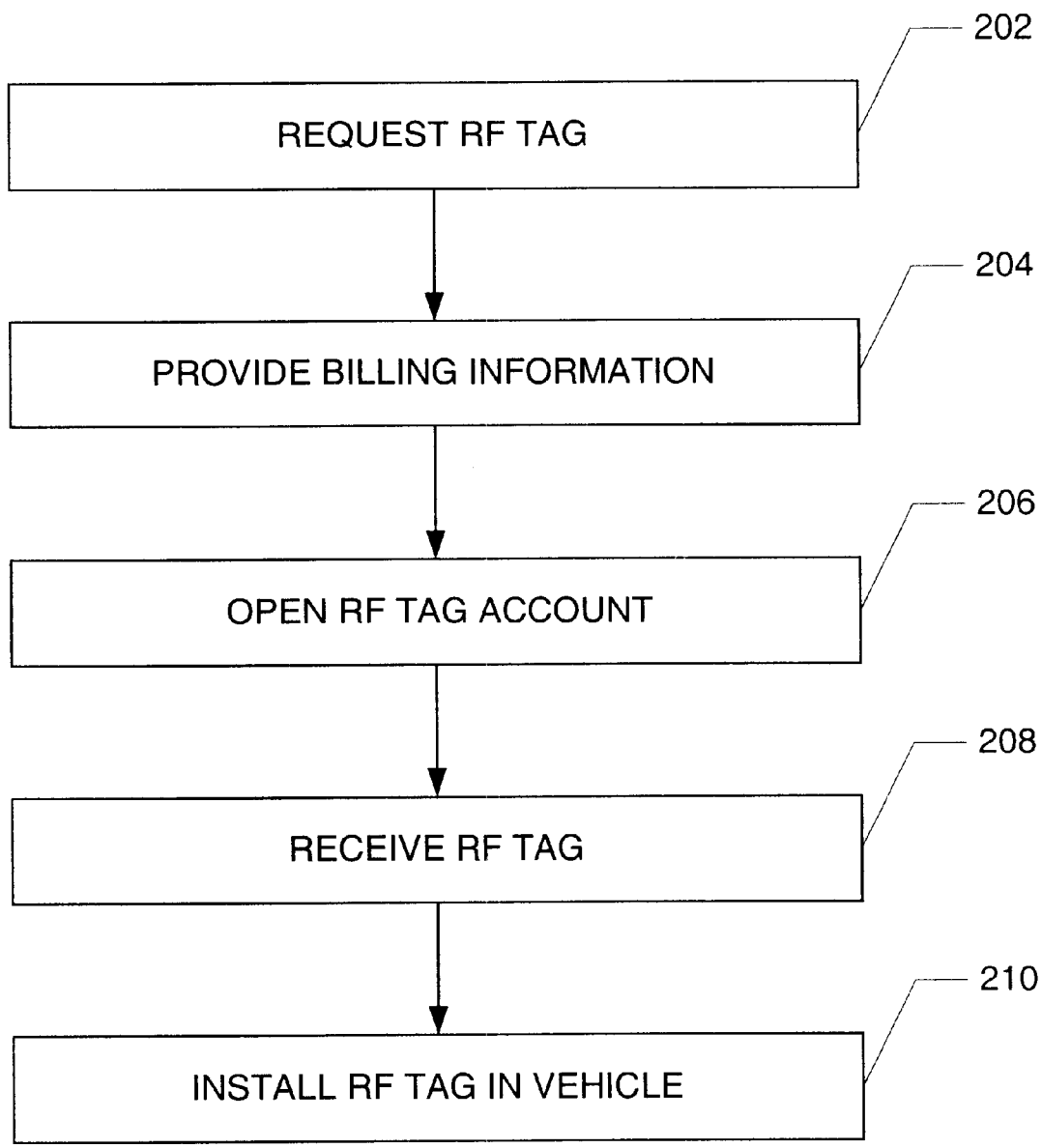
FIG. 2—illustrates a prior art method for establishing a RF tag account with a third party.
Figure 3:
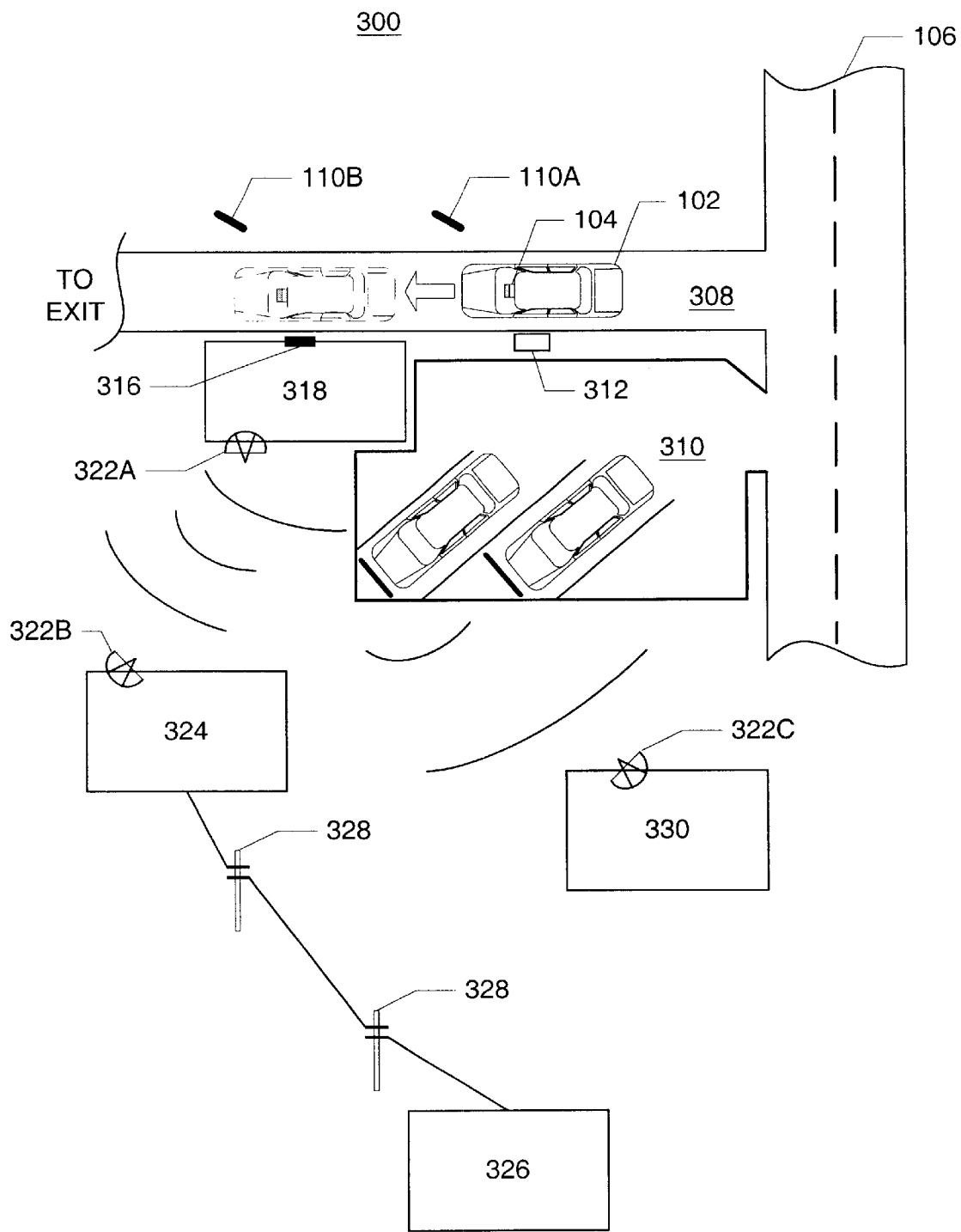
FIG. 3—illustrates a system for utilizing RF tags to facilitate drive-through ordering at a vendor location.

FIG. 3 illustrates an embodiment of the invention that may be used for purchasing goods at a drive-through window. The overall layout is shown as 300. More specifically, a vehicle 102 is equipped with an RF tag 104. To utilize the invention, vehicle 102 traveling on a roadway 106 turns into a drive-through lane 308 operated by a fast food establishment, hereinafter referred to as food vendor. The drive-through lane 308, of FIG. 3, is separate from the main parking lot 310. Most establishments will utilize the configuration shown in FIG. 3 to decrease confusion and congestion in the main parking lot, although the invention can be employed where the drive-through lane 308 and parking lot 310 are connected.

After turning into drive-through lane 308, vehicle 102 pulls up to an order station 312. Order station 312 may contain a large display showing the available menu items and associated prices (not shown). Vehicles not using the invention must stop at order station 312 and place their order by speaking into a two-way intercom (not shown). The use of two-way intercoms takes time because a customer must read the menu board and decide on the desired items before speaking the order into the intercom. Often times the customer is not heard and must repeat the order because the intercom is often several feet away from the vehicle. In addition, vehicle noise and a customer's speech dialect can cause the teller, taking the order, to make mistakes.

In contrast, vehicles utilizing the invention only stop at order station 312 if they want to place an order that varies from their default menu. A customer creates a default menu prior to placing an order using the invention. Once defined, the default menu is used anytime a customer places an order using the invention unless the customer manually changes an order immediately prior to receiving the order items from a fast food teller. Placing modified orders is akin to ordering menu items using present state of the art methods, namely the customer speaks commands to the fast food teller. Placing modified orders is hereinafter described in more detail in conjunction with FIG. 4 and FIG. 5.

Still referring to FIG. 3, if a customer plans to order from their default menu, they continue past order station 312 without stopping. As vehicle 102 passes order station 312, a first RF transponder 110A interrogates RF tag 104 using a query signal 112. First and second RF transponders 110A and 110B, respectively, are normally located off to the side of the drive-through lane and angled toward approaching cars. An offset arrangement of RF transponders avoids cluttering the drive-through lane and distracting customers. In fact, in most installations, customers are unaware of the RF transponders.

The interrogated RF tag 104 produces a coded return signal 114, which is received at first RF transponder 110A. First RF transponder 110A processes return signal 114 to extract the identification information contained therein. The identification information is communicated from first RF transponder 110A to a database maintained by the food vendor (not shown). The database contains information about valid RF tag accounts, valid customer accounts between the tag-vendor and food-vendor, and selected menu preferences. The database can be located at the food vendor's facility where the order is being processed, or it can be located at a remote location, in which case it is connected to first and second RF transponders 110A and 110B by a communication means, for example V-sat dishes 322A and 322C, respectively. The communication means may be a telephone line, a wireless link, a fiber optic link, or a network connection such as the Internet.

Accordingly, account validation can be performed in two ways, namely local or remote. Local account validation occurs when the database and processing system are located at the food vendor's location where the customer's order is taken. Local account validation is performed as follows. Prior to processing a customer order, food vendor 318 contacts tag-vendor 324 and downloads a listing of valid accounts. The downloaded information is stored on a storage medium coupled to a computer and a local network at food vendor's location (shown as 318 in FIG. 3). Food vendor 318 can chose to download information about all valid accounts residing with tag-vendor 324 or, alternatively, food vendor 318 can download only the account information corresponding to a customer registered with both food vendor 318 and tag-vendor 324. To keep the customer account list current, food vendor 318 may download account listings at some regular interval, say once per day, or once per hour. To process a customer order using local account validation, first and second RF transponder 110A and 110B communicate with locally stored data after receiving a return signal 114. When an account is successfully validated, the customer's credit card account is billed for the cost of the delivered meal just prior to filling the order.

Alternatively, if all of the information required to validate a customer account is not local to food vendor 318, then remote account validation occurs as follows. When first RF transponder 110A receives return signal 114, food vendor 318 communicates the RF tag identification information to a tag-vendor's location 324. V-sat communication links are a common way of performing this communication and thus will be used as a non-limiting example. To communicate using V-sat, food vendor 318 transmits information to an orbiting satellite using a first V-sat dish 322A located at the food vendor's premises. The V-sat signal arrives at the satellite and is retransmitted to a second V-sat dish 322B located at the tag-vendor's location 324. Tag-vendor 324 processes the information to validate the account and re-transmits a response back to food vendor 318 using the same technique. Alternatively, food vendor 318 can communicate to tag vendor 324 using copper phone lines, cellular transmissions, fiber optic transmissions, and the like.

Tag-vendor 324, may in some instances, communicate with a credit card issuer 326 to verify a valid card account and bill the amount of the purchase. Communication to credit card issuer 326 can be accomplished using landlines 328 or via other communication means such as V-sat, cellular, fiber optic, or the like (not shown). If tag-vendor 324 performs the billing for a customer's order, then food vendor 318 must communicate the purchase amount along with the RF tag identification information. Otherwise, food vendor 318 communicates the purchase amount directly to credit card issuer 326 using known methods (not shown).

To facilitate corporate record keeping, food vendor 318 may also communicate information about the order to a main office 330. Communication to main office 330 is often accomplished using a third V-sat dish 322C, although other communication means can also be used. Main office 330 uses information about a customer and a customer's order to facilitate ongoing business functions such as ordering supplies for vendor location 318, computing budgets, tracking customer preferences, creating sales promotion programs, etc.

Exemplary Method for Establishing an Account with a Food Vendor

Figure 4:
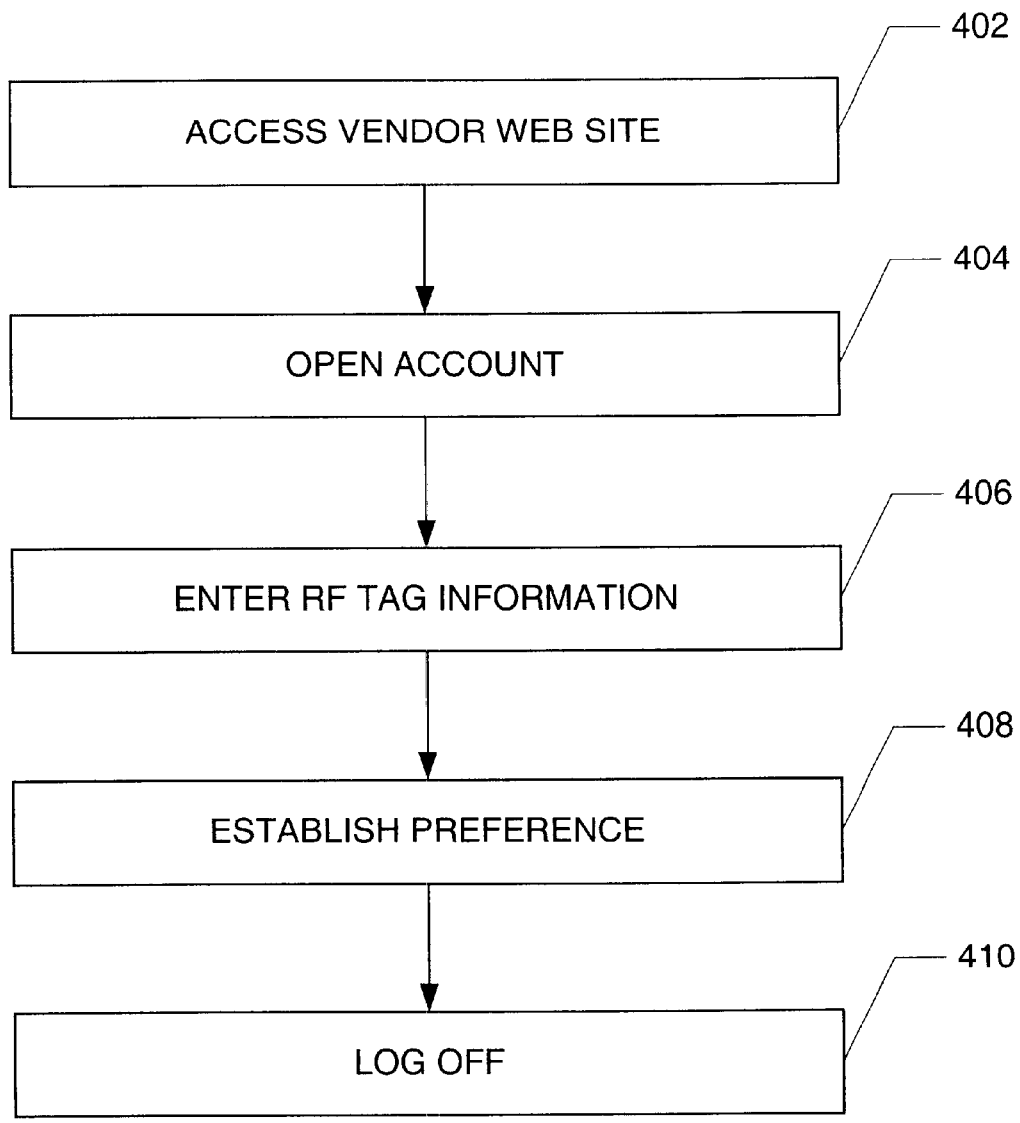
FIG. 4—illustrates a method for establishing an account and a preference menu with a vendor.

FIG. 4 illustrates a method for establishing a customer account with food vendor 318. A customer establishes an account with food vendor 318 prior to making a drive-through purchase using RF tag 104. An account is opened as follows. A customer accesses a food vendor's web site using the Internet and a computer running a web browser program (step 402). After connecting to the food vendor's web site, the customer opens an account by following the procedure displayed on the web site (step 404). Normally, opening an account will require that the customer choose a user name and password and then enter personally identifying information such as name and mailing address along with providing RF tag account information to facilitate billing (step 406). After choosing a user name, a password, and entering RF tag information, the customer account is valid. Once the account is valid, the customer selects their menu preferences (step 408). When the customer is finished with selecting menu preferences, they log off of the food vendor's web site (step 410). Now the customer is ready to begin using the invention to make drive-through purchases at the food vendor's facilities.

Figure 5:
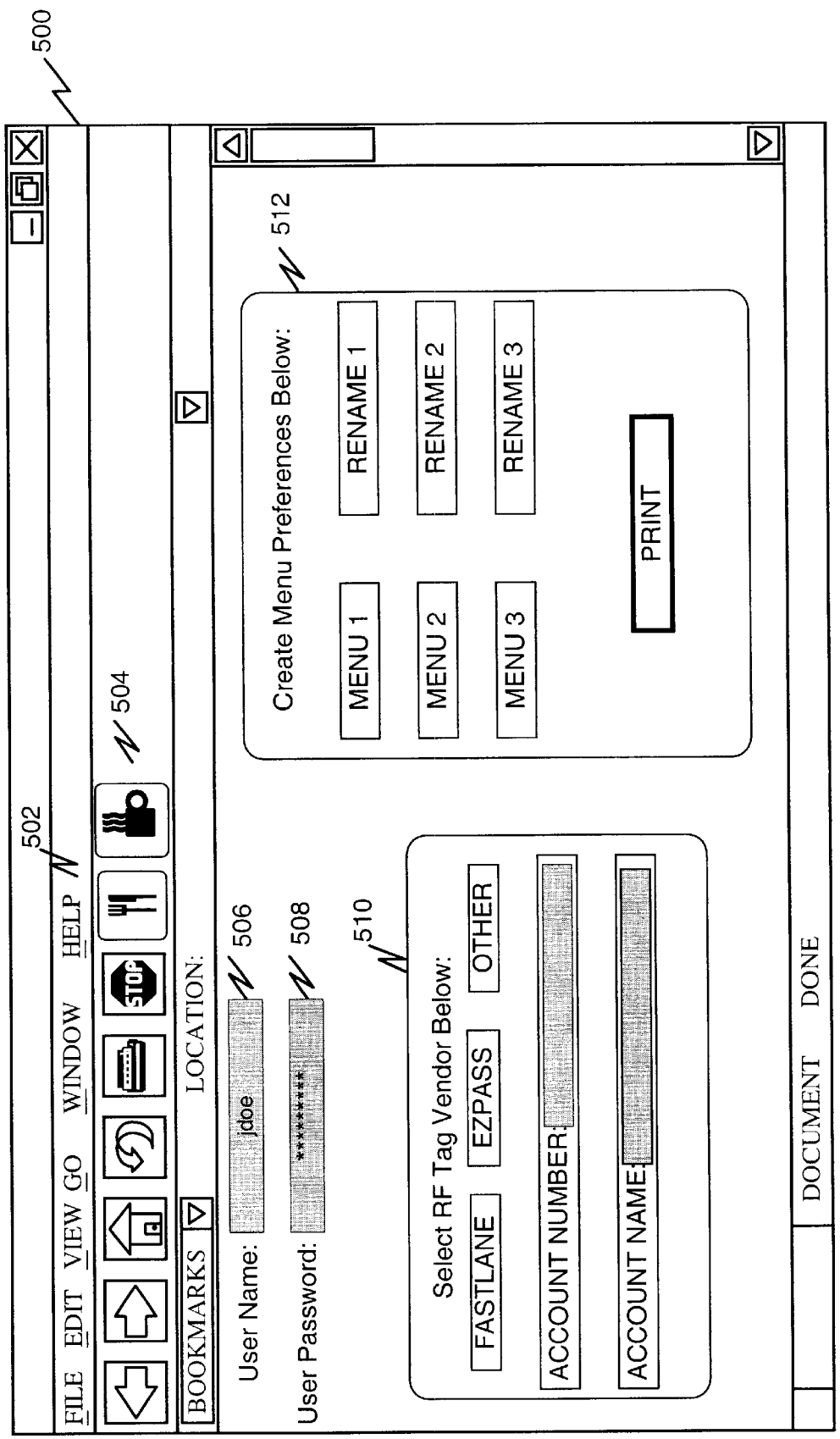
FIG. 5—illustrates an exemplary user interface display for establishing a customer account and preference menu.

FIG. 5 illustrates an exemplary user interface for establishing or modifying a customer account on a food-vendor's web site. The general layout of display window 500 may be that of a web browser page. Pull-down menus 502 are located in the upper left corner of display window 500. Pull-down menus 502 provide the customer with the standard functionality commonly found in computer applications. For example, if File is clicked-on using a computer mouse, a drop down menu is displayed providing the customer with functions such as save file, print, etc. Short cut buttons 504 are located below pull down menus 502. Short cut buttons 504 provide the customer with a means for accomplishing common tasks with a single mouse click. For example, clicking on the rightmost shortcut button (coffee mug) takes the customer to a sub-window displaying available beverages. From the beverage sub-window, the customer selects the sizes and types of beverages to be placed onto a preferred menu.

As used in the present disclosure, a sub-window is a display area that is opened from a presently viewed display area. Normally, the sub-window does not occupy the entire display screen. In addition, a sub-window may be defined by a border to focus the user's attention on the information contained therein. Text and/or graphics can be placed through out a sub-window as desired, and users may be allowed to enter, or modify, displayed data using a keyboard and mouse.

Before a customer can assemble a preferred menu, they must have a valid account. If a customer has not yet established an account, the following steps may be performed. First, the customer accesses the food vendor's website using a web browser (step 402). When the food vendor's web page is displayed, the customer enters a username 506 and password 508 (step 404). The food vendor's system informs the customer that the chosen user name is not valid. The system then asks the customer if they want to establish a new account. When the customer desires to establish a new account, the system determines if the selected username and password are available; and if they are, the system accepts them and instructs the customer to complete the information in RF tag window 510 (step 406).

RF tag window 510 comprises one-click buttons for the most prevalent types of RF tags, here EZPASS (http://www.ezpass.com) and FASTLANE (operated by the Massachusetts Turnpike Authority). If a customer presently uses one of the prevalent RF tags, they click on the appropriate button and the necessary contact information for the respective tag vendor is loaded from a database and associated with the customer's account. If the customer does not have an RF tag from one of the prevalent vendors, then they click on the OTHER button. Clicking on the OTHER button, in RF tag window 510, causes a sub-window to open so that the customer can enter the required information for a new tag vendor, namely the name, address, and phone number.

An ACCOUNT NUMBER field and ACCOUNT NAME field are also used in RF tag window 510 to ensure that proper billing takes place. The customer enters the required information; and when finished, the information is encrypted using known methods and sent to the tag vendor's site for verification. Upon receiving the encrypted information from RF tag window 510, the tag-vendor's site verifies the account information. In addition, the tag-vendor makes an entry into a database indicating that the customer has opened an account with a food vendor employing the disclosed invention. That way, tag-vendor 324 will expect, and therefore accept, periodic transactions occurring between the customer and a food vendor employing the invention.

After a customer has established an account, or alternatively logged into an existing account, the customer may access menu window 512. Menu window 512 allows the customer to configure one or more preferred menus (step 408). If one preferred menu is selected, it becomes the customer's default menu. As such, the default menu will be used for all drive-through transactions until it is modified by choosing another default menu. If more than one preferred menu is selected, then the customer must identify one of them as the default menu to be used in lieu of modifications made at the time of ordering. Menu window 512 also allows the customer to rename their menu preferences, thus making them easier to remember. Clicking on the respective RENAME button located opposite a MENU button opens a sub-window allowing the customer to give a menu preference a unique name that is easier for them to remember. For example, MENU1 can be renamed to Family, MENU2 can be renamed to My_Breakfast, etc. Finally, the customer can print the contents of the preferred menus by clicking on the PRINT button located within menu window 512.

Exemplary Method for Practicing an Embodiment of the Invention

Figure 6:
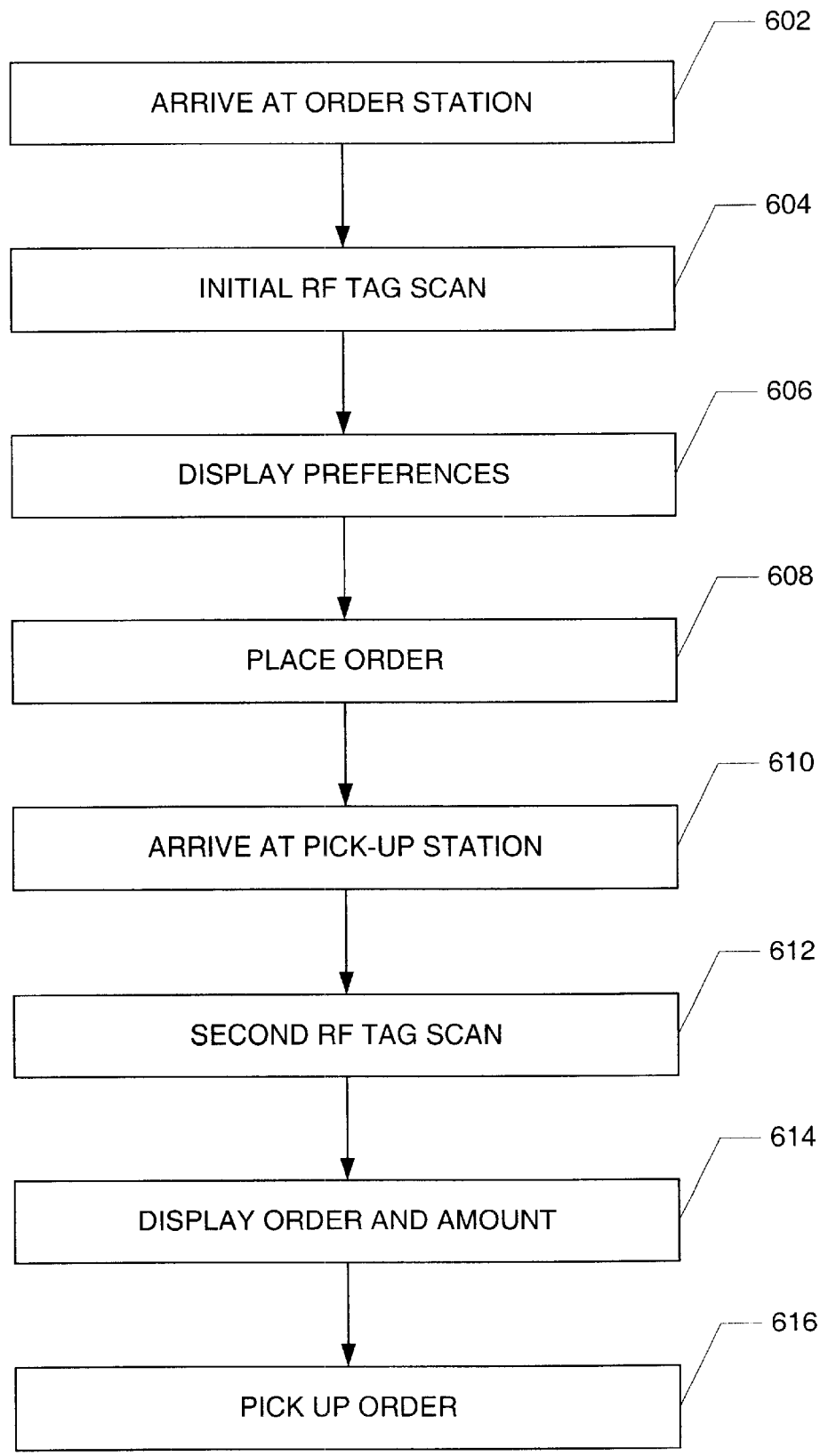
FIG. 6—illustrates a method for obtaining an order using the invention.

FIG. 6 illustrates a method for practicing the invention. A customer arrives at order station 312 in a vehicle 102 that is equipped with an RF tag 104 (step 602). An initial RF tag scan is performed as vehicle 102 approaches order station 312 (step 604). When RF transponder 110A processes return signal 114, the customer's default menu is retrieved from a database and displayed at order station 312 (step 606). If the customer wishes to order from the default menu, they continue to pick-up station 316. If the default menu is ordered, the customer's order is processed by food vendor 318 as vehicle 102 pulls up to pick-up station 316 (step 608).

Modifications to the preferred menu can be made if the customer stops at order station 312 and verbally alters the order contents (also step 608). If the customer modifies the order, a teller enters the changes into the computer system run by food vendor 318.

The ordered items are prepared and made available to pick-up station 316. When vehicle 102 stops at pick-up station 316 to receive the ordered items, a second scan of RF tag 104 is performed using RF transponder 110B (step 612). The second scan causes the customer's account to be charged and for the order contents to be displayed on a screen adjacent as to pick-up station 316 (step 614). If the customer is satisfied with the displayed order information, they pick up the order and depart the fast food vendor's drive-through lane (step 616).

Exemplary System for Practicing an Embodiment of the Invention

Figure 7:
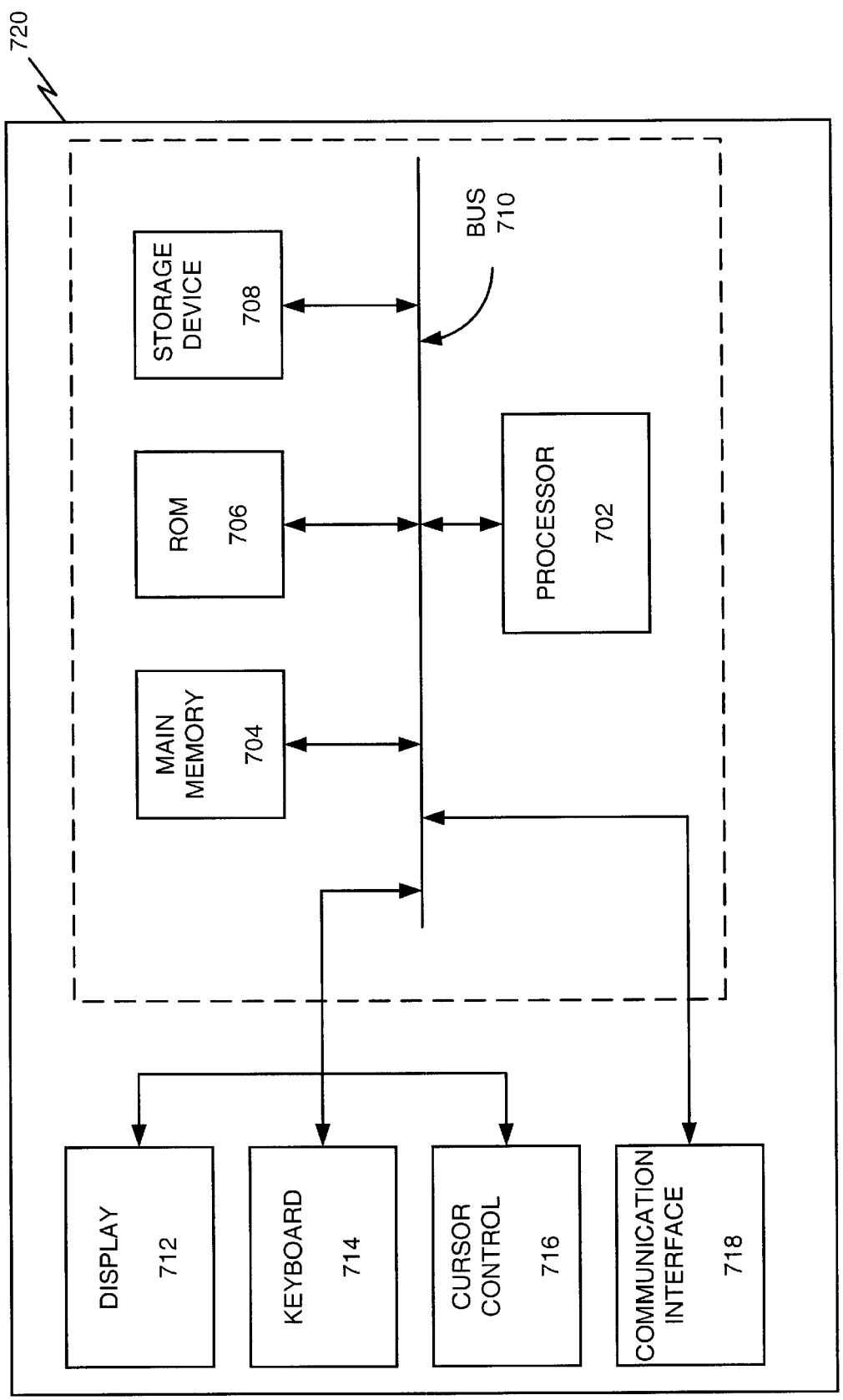
FIG. 7—shows a general-purpose computer capable of being configured to practice an embodiment of the invention.

FIG. 7 illustrates a computer 720 that may be configured to practice the disclosed invention. The exemplary computer 720 includes processor 702, main memory 704, read only memory (ROM) 706, storage device 708, bus 710, display 712, keyboard 714, cursor control 716, and communication interface 718.

The processor 702 may be any type of conventional processing device capable of interpreting and executing instructions. Typically, processor 702 will be a digital microprocessor, but other types of processors can be used if desired. Main memory 704 stores information and instructions that are executed by processor 702. Temporary variables and other intermediate values may be stored in main memory 704 during the execution of instructions by processor 702. ROM 706 stores static information and instructions used during execution of instructions by processor 702. Wherein static information and instructions are those that do not regularly change over time. It will be appreciated that ROM 706 can be replaced by Electrically Programmable ROMs (EPROMs) or other non-volatile memory.

Storage device 708 stores information and instructions executed by processor 702. Typically, storage device 708 is used to store information such as data, computer programs, network information and the like. Storage device 708 may include any type of magnetic or optical media. Examples of storage devices 708 include disk drives, optical drives, CDROMS, floppy disks, solid-state disks and the like. Bus 710 includes a set of hardware lines that facilitate data transfer between bus 710 to other parts of computer 720.

Display device 712 is used to display information to a teller employed at food vendor 318 or to a customer in vehicle 102. Display device 712 may be comprised of a cathode ray tube (CRT), LCD display, or the like. Keyboard 714 and cursor control 716 allow an operator, or teller, to interact with computer 720. When used by food vendor 318, the keyboard 714 and cursor control 716 are often replaced with a customized touch pad that includes numbered keys and special keys representing particular menu items. Alternatively, keyboard 714 and cursor control 716 can be replaced by a microphone and voice recognition means to allow an operator to interact with computer 720. Communication interface 718 enables computer 720 to communicate with other systems and devices over a communication medium. For example communication interface 718 can be an Ethernet interface, an ATM interface, a wireless modem interface, a printer interface, a SONET interface or the like.

A computer 720 consistent with the present invention provides a fast food vendor, a customer, or a tag-vendor with the ability to process transactions and communicate over a network. The computer 720 performs operations necessary to complete a desired action in response to processor 702 executing sequences of instructions contained in, for example, main memory 704. Such instructions may be read into main memory 704 from another computer-readable medium such as storage device 708 or from another from a remote device using communications interface 718. Execution of the sequences of instructions contained in main memory 704 causes processor 702 to perform a method such as that shown in FIG. 4. For example, processor 702 may execute instructions to perform the functions of receiving information from a customer terminal to facilitate the opening of an account. Alternatively, hard-wired circuitry may be used in place of or in combination with software instructions to implement the present invention. Thus the present invention is not limited to any specific combination of hardware circuitry and software.

Other Exemplary Embodiments of the Invention

Thus far disclosed embodiments of the present invention have been described in conjunction with drive-through food offerings. Here it is noted that the invention can be employed for many other uses, and in many embodiments, without departing from the spirit of the invention. For example, a customer can establish their preferences and set up accounts with third party vendors using means other than the Internet. For instance, a customer can open an account with a food vendor 318 using a telephone and Interactive Voice Response (IVR) technology. IVR allows a customer to provide the required information by speaking and/or using dial-pad entries with a telephone. Alternatively, fast food establishments can place a kiosk at their facility, or at a third party's facility, such as a shopping mall, so that customer's can establish accounts and preferences. A kiosk is a device that provides a user, here customer, with a data entry means, usually a keyboard, and a display. The kiosk contains a computer executing instructions enabling a customer to perform the operations necessary to accomplish a given task. Here the task is setting up a customer account and establishing menu preferences so that the customer can subsequently perform drive through transactions in a vehicle with RF tag 104. Additionally, the kiosk is communicatively coupled to a food vendor's processing system to complete account setup.

The disclosed embodiments can be modified in other ways to facilitate other types of transactions. For example, the general embodiment of FIG. 3 can be modified slightly so that a customer can use the RF tag drive-through to purchase prescription medications. In this embodiment, a patient would set up an account on a pharmacy's web site so that a selected tag-vendor would be billed for purchases. To have a prescription filled for the first time, a patient's doctor enters the prescription information and the patient information into the pharmacy's web site using an interface similar to that shown in FIG. 5. Then, the pharmacy's system verifies the patient's insurance information and prepares the prescription. In the case of a pharmacy chain, the system would designate that the prescription to be filled at a specific location selected by the patient. The selected pharmacy will have a drive-through lane to expedite service for customer's employing RF tags.

To receive the prescription, the customer pulls into the pharmacy drive-through lane and an RF transponder 110A scans RF tag 104 as the vehicle pulls up to the order window. Upon scanning, the customer and prescription information are displayed on a CRT for the clerk staffing the pharmacy order window. The clerk retrieves the prescription and delivers it to the customer.

In another embodiment, the invention may be used for drive-through video rentals. In this embodiment, a video rental facility has a drive-through lane. Prior to picking up a video, a customer opens an account on the video rental facility's web site and sets up a list of preferences. For example, a customer may get on a new release list. When on the new release list, a database keeps track of which new release movies the customer has watched. Any new releases that have not been watched by the customer are randomly selected based upon the shelf inventory at the video rental facility when the customer arrives at the drive-through lane.

As the customer pulls up to the order window, an RF transponder 110 scans RF tag 104. Return signal 114 is processed by the processing system at the video rental facility. A database is queried and it returns the name of an unwatched new release that is presently in stock. The processing system also contacts the tag-vendor and bills the rental amount to the customer's account. If the charge is authorized by the tag-vendor, a teller retrieves the video and hands it to the customer along with a receipt.

Still other embodiments of the invention can be used to enable efficient drive-through transactions for photo developing establishments, for picking up tickets at travel agents, for car washes, etc. In addition, embodiments can employ active RF tags rather than the passive RF tags, previously discussed. Active RF tags contain a power source and electronic circuitry that enable the RF tag to be programmed with various types of information and instructions. The use of programmable RF tags allows the invention to be used for more complex applications such as vehicle maintenance.

For vehicle maintenance, a garage may input repair information into the RF tag located inside a vehicle. Then, if the vehicle owner goes to another garage employing the invention, the second garage can automatically download the repair history from the active RF tag and perform required periodic maintenance or other repairs without requiring the customer to spend time relaying information about the vehicle. The active RF tag embodiment can also be used to pay for the service as was done using passive RF tags.

CONCLUSION

As was shown, the disclosed embodiments of the invention allow a customer to perform purchasing transactions using active and passive RF tags. The invention saves time for a customer while, at the same time, allowing a vendor to process orders in less time. The invention also increases order accuracy by reducing the chance for human error at the time of transaction. Finally the invention is easily adapted for handling a variety of transactions involving different types of goods and services.

The foregoing description and presentation of embodiments of the invention are not intended to be limiting in any respect. The spirit and scope of the disclosed invention is broadly defined by the appended claims.

What is claimed is:

1. A system for allowing a customer riding in its vehicle to make a purchase from a vendor having a drive-through establishment, said customer being an Internet subscriber and said vendor having its products and/or services advertised-on and orderable-through said Internet, said system comprising:

first means for establishing a customer's account over said Internet with said vendor, said account being chargeable against a credit card of said customer;

second means for establishing over said Internet with said vendor one of said products and/or services as a selection-default product and/or service;

a vehicle-establishment communication area located on said drive-through establishment and accessible to said vehicle;

third means associated with said vehicle and under control of said customer in cooperation with fourth means located at said drive-through establishment and under control of said vendor for automatically placing and receiving an order on behalf of said customer for said selection-default product and/or service when said vehicle is driven by said vehicle-establishment communication area; and, fifth means, under control of said vendor, for automatically charging said credit card for said order.

2. The system of claim 1 and wherein said first means is utilized by said customer.

3. The system of claim 1 and wherein said second means is utilized by said customer.

4. The system of claim 1 and wherein said third means includes an RF tag and said fourth means includes an RF transponder for wirelessly placing and receiving said order respectively.

5. The system of claim 1 and wherein said third means includes suppression means for suppressing said placing of said order if said customer stops said vehicle prior to driving by said vehicle-establishment communication area and orders from a teller of said vendor either said order or a different order consisting of other than said selection-default product and/or service.

6. The system of claim 5 further comprising sixth means for allowing said customer to authorize payment from said credit card through said teller upon receipt and approval by said customer of said order or said different order during operation of said suppression means.

7. The system of claim 1 and wherein said one of said products and/or services is selected from a menu comprising food items and said drive-through establishment is a restaurant.

8. The system of claim 1 and wherein said one of said products and/or services is a prescription medication and said drive-through establishment is a pharmacy.

9. The system of claim 1 and wherein said one of said products and/or services is a video tape, and said drive-through establishment is a video tape rental store.

10. The system of claim 1 and wherein said one of said products and/or services is a photograph developing service and said drive-through establishment is a photograph developing establishment.

11. The system of claim 4 and wherein said RF tag is an active RF tag.

12. A method for allowing a customer riding in its vehicle to make a purchase from a vendor having a drive-through establishment, said customer being an Internet subscriber and said vendor having its products and/or services advertised-on and orderable-through said Internet, said method comprising:

establishing a customer's account over said Internet with said vendor, said account being chargeable against a credit card of said customer;

establishing over said Internet with said vendor one of said products and/or services as a selection-default product and/or service;

providing a vehicle-establishment communication area located on said drive-through establishment and accessible to said vehicle;

automatically placing and receiving an order on behalf of said customer for said selection-default product and/or service when said vehicle is driven by said vehicle-establishment communication area; and, said vendor automatically charging said credit card for said order.

13. The method of claim 12 and wherein said establishing a customer's account is performed under control of said customer.

14. The method of claim 12 and wherein said establishing a selection-default product and/or service is performed under control of said customer.

15. The method of claim 12 and wherein said automatically placing and receiving employs an RF tag and an RF transponder for wirelessly placing and receiving said order respectively.

16. The method of claim 12 and further including suppressing said placing and receiving of said order if said customer stops said vehicle prior to driving by said vehicle-establishment communication area and orders from a teller of said vendor either said order or a different order consisting of other than said selection-default product and/or service.

17. The method of claim 16 further comprising allowing said customer to authorize payment from said credit card through said teller upon receipt and approval by said customer of said order or said different order during said suppressing.

18. The method of claim 12 and wherein said one of said products and/or services is selected from a menu comprising food items and said drive-through establishment is a restaurant.

19. The method of claim 12 and wherein said one of said products and/or services is a prescription medication and said drive-through establishment is a pharmacy.

20. The method of claim 12 and wherein said one of said products and/or services is a video tape, and said drive-through establishment is a video tape rental store.

21. The method of claim 12 and wherein said one of said products and/or services is a photograph developing service and said drive-through establishment is a photograph developing establishment.

22. The method of claim 15 and wherein said RF tag is an active RF tag.

23. A computer program product including program code embodied in computer storage media and adapted to be run on a computer system, said computer program product enabling a customer riding in its vehicle to make a purchase from a vendor having a drive-through establishment including a vehicle-establishment communication area accessible to said vehicle, said customer being an Internet subscriber and said vendor having its products and/or services advertised-on and orderable-through said Internet, said computer program product comprising:

program code for establishing a customer's account over said Internet with said vendor, said account being chargeable against a credit card of said customer;

program code for establishing over said Internet with said vendor one of said products and/or services as a selection-default product and/or service;

program code for automatically placing and receiving an order on behalf of said customer for said selection-default product and/or service when said vehicle is driven by said vehicle-establishment communication area; and, program code for automatically charging said credit card for said order.

* * * * *